US012674034B2

(12) United States Patent
Velev et al.

(10) Patent No.: US 12,674,034 B2
(45) Date of Patent: Jul. 7, 2026

(54) BIODEGRADABLE BIOPOLYMER FILMS

(71) Applicant: North Carolina State University, Raleigh, NC (US)

(72) Inventors: Orlin D. Velev, Raleigh, NC (US); Yosra Kotb, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 933 days.

(21) Appl. No.: 17/584,569

(22) Filed: Jan. 26, 2022

(65) Prior Publication Data

US 2022/0235188 A1    Jul. 28, 2022

Related U.S. Application Data

(60) Provisional application No. 63/142,044, filed on Jan. 27, 2021.

(51) Int. Cl.
| | |
|---|---|
| *C08J 5/18* | (2006.01) |
| *B65D 65/46* | (2006.01) |
| *C08L 5/08* | (2006.01) |
| *C08L 5/12* | (2006.01) |

(52) U.S. Cl.
CPC .............. *C08J 5/18* (2013.01); *B65D 65/466* (2013.01); *C08L 5/08* (2013.01); *C08L 5/12* (2013.01); *C08J 2305/08* (2013.01); *C08J 2305/12* (2013.01); *C08J 2405/08* (2013.01); *C08J 2405/12* (2013.01); *C08L 2201/06* (2013.01); *C08L 2203/16* (2013.01)

(58) Field of Classification Search
CPC ...... C08J 5/18; C08J 2305/08; C08J 2305/12; C08J 2405/08; C08J 2405/12; B65D 65/466; C08L 5/08; C08L 5/12; C08L 2201/06; C08L 2203/16; C08L 5/04
See application file for complete search history.

(56) References Cited

U.S. PATENT DOCUMENTS

| | | | | |
|---|---|---|---|---|
| 2017/0158901 A1* | 6/2017 | Bisset | ...................... | C08L 1/12 |
| 2019/0153247 A1 | 5/2019 | Velev et al. | | |
| 2020/0222577 A1* | 7/2020 | Enrione Cáceres | .... | A61L 15/20 |

FOREIGN PATENT DOCUMENTS

| | | | | | |
|---|---|---|---|---|---|
| RU | 2005 125946 A | * | 8/2005 | | |
| WO | WO-2006118109 A1 | * | 11/2006 | ............. | C08L 1/284 |
| WO | WO-2014128354 A1 | * | 8/2014 | ............. | A61L 15/28 |

OTHER PUBLICATIONS

Machine English language translation of Olegovich, RU 2005 125946 A, Aug. 4, 2005. (Year: 2025).*

(Continued)

*Primary Examiner* — Coris Fung
*Assistant Examiner* — Caroline D. Liott
(74) *Attorney, Agent, or Firm* — Thomas | Horstemeyer, LLP

(57) ABSTRACT

Provided is a biopolymer composite film that includes a polysaccharide matrix reinforced with soft dendritic colloids and methods for making. The method can include dissolving agarose in water to form a first mixture, mixing nanofibrillated chitosan in the agarose, sonicating or stirring the mixture to form a homogeneous second mixture, casting the second mixture, and gelling the second mixture to form a film. Also provided is a food or consumer product packaging film that includes the biopolymer composite film.

12 Claims, 7 Drawing Sheets

(56)  References Cited

OTHER PUBLICATIONS

Liu et al, "Nanocomposites derived from licorice residues cellulose nanofibril and chitosan nanofibril: Effects of chitosan nanofibril dosage on resulting properties," Oct. 22, 2020, International Journal of Biological Macromolecules 165 (2020), pp. 2404-2411. (Year: 2020).*

Hai et al, "Chitosan Nanofiber and Cellulose Nanofiber Blended Composite Applicable for Active Food Packaging," Sep. 4, 2020, Nanomaterials 2020, 10, 1752, pp. 1-14. (Year: 2020).*

Hu et al, "Preparation and Characterization of Chitosan-Agarose Composite Films," Sep. 30, 2016, Materials 2016, 9, 816, pp. 1-9. (Year: 2016).*

Law, "Definitions for Hydrophilicity, Hydrophobicity, and Superhydrophobicity: Getting the Basics Right," 2014, The Journal of Physical Chemistry Letters, 5, pp. 686-688. (Year: 2014).*

N.C. State University, "Biopolymer Composite Films for Sustainable Packaging Applications," Jun. 23, 2020, https://ncsu.portals.in-part.com/d39bcae1-9ea6-4829-9cdf-3746bc426181. (Year: 2020).*

Soft Dendritic Microparticles with Unusual Adhesion and Structuring Properties; Roh et al., Nature Materials (Dec. 2019) vol. 18.

* cited by examiner

BIODEGRADABLE BIOPOLYMER FILMS

CROSS-REFERENCE TO RELATED APPLICATIONS

This application claims the benefit of and priority to U.S. Provisional Application Ser. No. 63/142,044, having the title "BIODEGRADABLE BIOPOLYMER FILMS", filed on Jan. 27, 2021, the disclosure of which is incorporated herein by reference in its entirety.

BACKGROUND

Traditional polymer films, such as those used in food and consumer product packaging, are not environmentally sustainable. Biopolymer alternatives, while not reliant upon petroleum-based ingredients, suffer from mechanical weakness and poor elasticity.

SUMMARY

Embodiments of the present disclosure provide for biopolymer films, methods of making biopolymer films, products including biopolymer films, and the like.

An embodiment of the present disclosure includes a biopolymer composite film that includes a polysaccharide and soft dendritic colloids.

An embodiment of the present disclosure also includes a method of making a biopolymer composite film. The method can include dissolving agarose in water to form a first mixture, mixing nanofibrillated chitosan in the agarose, sonicating or stirring the mixture to form a homogeneous second mixture, casting or extruding the second mixture, and gelling the second mixture to form a film.

An embodiment of the present disclosure also includes a consumer product packaging film that includes a biopolymer composite film. The biopolymer composite film can be formed from a polysaccharide and soft dendritic colloids.

Other compositions, apparatus, methods, features, and advantages will be or become apparent to one with skill in the art upon examination of the following drawings and detailed description. It is intended that all such additional compositions, apparatus, methods, features and advantages be included within this description, be within the scope of the present disclosure, and be protected by the accompanying claims.

BRIEF DESCRIPTION OF THE DRAWINGS

Further aspects of the present disclosure will be more readily appreciated upon review of the detailed description of its various embodiments, described below, when taken in conjunction with the accompanying drawings.

Figure 1:
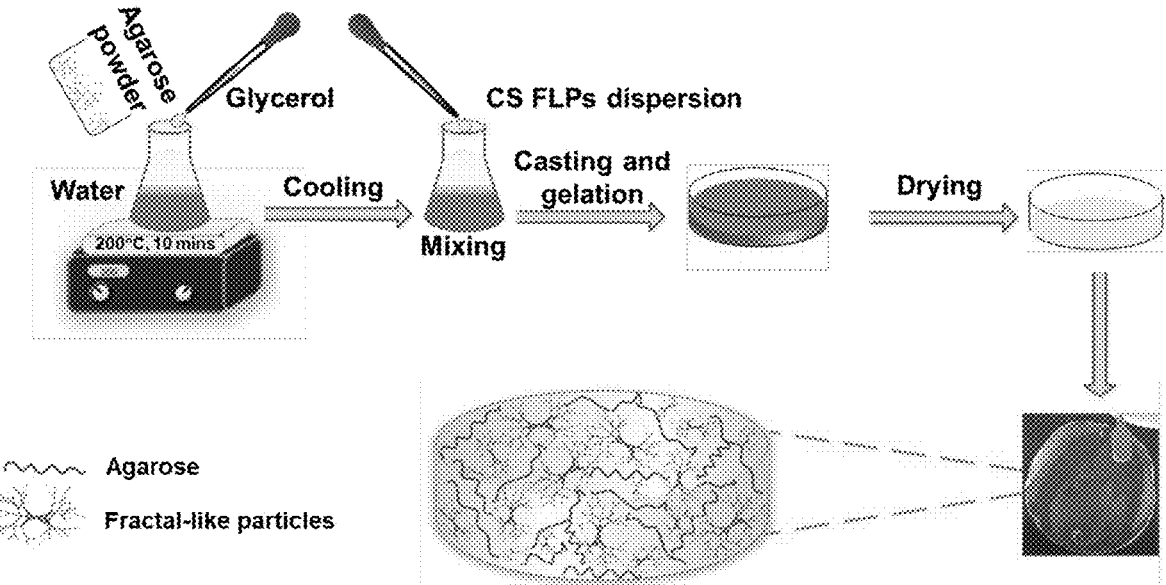
FIG. 1 is a diagram illustrating preparation of composite films from Agarose and Chitosan Fractal-Like Particles (AG-CS FLPs) with a digital photograph showing the dried film and the interaction between its constituents in accordance with embodiments of the present disclosure.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, material science, and the like, which are within the skill of the art.

The following examples are put forth so as to provide those of ordinary skill in the art with a complete disclosure and description of how to perform the methods and use the materials disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise.

General Discussion

In accordance with the purpose(s) of the present disclosure, as embodied and broadly described herein, embodiments of the present disclosure, in some aspects, relate to biopolymer composite films.

In general, embodiments of the present disclosure provide for methods of making biopolymer composite films, biopolymer composite film compositions, other types of biopolymer materials and products including biopolymer composite films and materials.

The present disclosure includes a biopolymer composite film comprising a composite of a polysaccharide matrix and fractal-like particles (FLPs, also referred to as "soft dendritic colloids" or SDCs).

In some embodiments, the fractal-like particles are synthesized from chitosan to form nanofibrillated FLP chitosan. Other polymers of natural origin that can be used to synthesize the fractal-like particles include chitin, cellulose, modified cellulose, cellulose derivatives, lignin, and lignin derivatives, lignocelluloses, starch and starch derivatives, polylactic acid, polycaprolactone, alginate and its derivatives. In yet other embodiments, the FLPs can be made from synthetic polymer such as cellulose acetate and its derivatives.

In some embodiments, the polysaccharide matrix can be agarose. Advantageously, any dissolvable polymer can be used in place of the polysaccharide, (e.g., PLA, alginate, starch, cellulose derivatives, carrageenan, gelatin, wheat gluten). Combinations and mixtures of biopolymers can also be used. In some embodiments, the FLPs can be about 5% w/w to 70% of the polysaccharide, about 5% w/w-15% w/w, or higher fraction of the polysaccharide. In some embodiments, the FLPs are made of nanofibrillated chitosan, and the nanofibrillated chitosan in the film is about 5% w/w to 70% w/w of the agarose or about 5% w/w to 20% w/w of the agarose.

In some embodiments of the film, the fractal-like particles are synthesized from chitosan to form nanofibrillated chitosan and the polysaccharide is agarose.

Advantageously, the films described herein provide increased mechanical strength over other biopolymer films, and even certain petroleum-based films. In some embodiments, the tensile strength can be from about 40 MPa to 70 MPa. In a particular example in which the nanofibrillated chitosan is about 15% w/w of the agarose, and the tensile strength is about 50 MPa. In other examples, such as AG-CS FLPs 5 and 10 films, the tensile strengths can be about 37 and 44 MPa respectively.

In some embodiments, the thickness of the film can be about 2 microns to 2 mm, about 20 microns to 200 microns, or about 70 microns.

In some embodiments, the addition of chitosan FLPs to reinforce an agarose film resulted in a four-fold increase in strength over agarose films, without increasing brittleness. The film can have elasticity (based on elongation at break) of about 10% to about 15%.

Advantageously, in some embodiments the film is optically transparent.

Advantageously, the film exhibits high hydrophobicity and low oxygen permeability.

In some embodiments, the film can have a water contact angle of about 85° to 95°. The oxygen permeability of the film can be from about 6.00 to 300 cm$^3$ μm (m$^2$ day kPa)$^{-1}$ or about 6.07 [cm$^3$ μm (m$^2$ day kPa)$^{-1}$].

Embodiments of the present disclosure include methods of making a biopolymer composite film as above, wherein the method includes dissolving agarose in water to form a first mixture followed by mixing nanofibrillated chitosan in the agarose. The first mixture can be sonicated to form a homogeneous second mixture. Then the second mixture can be casted and gelled to form a film. In some embodiments, the first mixture further can also include a plasticizer to reduce or prevent defects. Advantageously, the method is simple, fast, and inexpensive. It may involve only water-based solutions and can be scaled up for industrial-level production.

Embodiments of the present disclosure include food or other consumer product packaging films and enclosures including a polysaccharide and soft dendritic colloids. Advantageously, the film has the characteristics of high hydrophobicity and low oxygen permeability when compared to other biopolymer films, providing protection from spoilage and moisture to packaged foods. The film is optically transparent, allowing consumers a visual inspection of the contents of the packaging. The consumer product packaging films can be used for such as shopping bags, replacement for single-use plastic packaging and utensils, pharmaceutical packaging, product packaging with products such as: food, cosmetics (e.g. hair care, skin care, lotions, makeup), pharmaceuticals, household items, and household products (e.g. laundry products, cleaning products).

Examples

Now having described the embodiments of the disclosure, in general, the examples describe some additional embodiments. While embodiments of the present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

Described herein are biopolymer composite films based on agarose and nanofibrillated chitosan for applications such as sustainable food packaging material. The film includes reinforcement of the agarose matrix with nanofibrillated chitosan particles, leading to the formation of tough and optically clear films. The soft fractal-like (dendritic) chitosan microparticles are synthesized via a facile, scalable, and green process of polymer precipitation in a turbulently sheared non-solvent crosslinking medium. The precipitation process yields highly branched ionically crosslinked chitosan microparticles with surrounding nanofibrillar coronas.[1] These particles exhibit excellent interparticle adhesion due to both their crosslinking and the multidirectional spreading of the nanofiber corona around them. The unique morphology of these chitosan microparticles makes them ideal as reinforcing materials as they have a strong propension for an adhesive network formation. The incorporation of these microparticles within an agarose film matrix produces biocompatible, environmentally benign films with excellent mechanical and optical properties. "Environmentally benign" films, as used herein, describe films made out of naturally derived materials; the films can be fully biodegraded into nontoxic species under common conditions of disposal, in a timely manner, without requiring manual interference.

The films are prepared by a facile solvent mixing of chitosan microparticles and agarose followed by solution casting. The presence of a high interfacial area, due to the nanofiber coronas around the microparticles, makes significant improvements in the films' properties even at low microparticles loading. In some embodiments, the solvent is water. These biopolymer films mechanically outperform most of the common present bio-based packaging materials that face major problems due to fragility and increased water uptake. The films could also be much less water vapor and oxygen permeable. The efficient and continuous water-solvent based fabrication process, the completely natural, sustainable, and biodegradable components as well as the excellent mechanical and optical properties of these films can easily lead to their commercial use as sustainable packaging alternatives.

Over the past three decades, increased production and consumption of fossil fuels-based plastics have created dire environmental and ecological impacts. In 2015, worldwide plastics production reached 7.8 billion tons, of which less than 20% was recycled with the rest being discarded in the environment or incinerated.[2] The packaging industry accounts for more than 26% of the total plastics produced from which a staggering 90% becomes non degradable waste after a single use.[3] This waste is a major source of microplastic particle contamination of the world oceans and seas. To limit the environmental damage, there is a rapidly growing industrial and scientific interest to come up with alternatives for the petroleum based plastic packaging.

Among the available alternatives, biopolymers derived from natural and sustainable resources represent an attractive option to replace the conventional petro-based polymers. These biobased polymers provide an environmental advantage, sustainability, and biodegradability. However, performance limitations and high production cost have hindered the widespread use of these polymers, restricting them to certain niche markets that represent less than 1% of the plastics market.[4] For biopolymers to secure their foothold in the market, several shortcomings must be tackled such as high/low water and oxygen permeability, mechanical brittleness, thermal stability, water uptake, and instability during processing. Numerous studies have considered polysaccharides derived from natural resources as potential biopolymer candidates for packaging such as cellulose, chitosan, starch, and agarose.

Agarose is a natural polysaccharide derived from seaweed consisting of D-galactose and 3,6-anhydro-L-galactopyranose units. It is biodegradable, inexpensive, abundantly available, and its solution goes through a sol-gel transition at temperatures ranging from 32° C. to 47° C. Apart from its use in electrophoresis and chromatography, agarose can be used as a packaging material due to its excellent film forming ability and adequate mechanical strength. Many researchers have investigated the preparation of packaging films from agarose, focusing mainly on improving the mechanical properties and the water uptake of the biopolymer films.[5,6,7] One well-studied method for enhancing these properties is to reinforce the biopolymer matrix with nano- or microparticles. Several agarose nanocomposites have been developed using clay, silver, and cellulose nanoparticles, to name a few. Important aspects should be considered to reinforce a polymer matrix with nano or microparticles, namely the homogeneous dispersion and random orientation of these particles within the matrix.

A new class of polymeric nanofibrous material, called fractal like particles (FLPs) or equivalently called soft dendritic colloids (SDCs), can be prepared by polymer solution injection in a turbulently sheared non solvent flow (PCT/US2017/031786, herein incorporated by reference).[1] The fabrication process is continuous and scalable and produces highly branched polymeric particles surrounded by multidirectional nanofiber coronas. The morphology of these particles can be controlled by altering the shear rate of the polymer non solvent or by changing the polymer concentration in the injection solution. These particles show great promise as filler materials due to their high aspect ratio and high interfacial area. The present disclosure demonstrates that reinforcing the agarose matrix with FLPs (in this case, chitosan FLPs) fabricated with this shear driven polymer precipitation technique produces highly tough, optically clear, and water-resistant films that can be applied as packaging material. The highly versatile and environmentally benign fabrication process can be used to produce an all-natural and biodegradable packaging material that can compete in the fledgling bioplastics market.

Materials

Low molecular weight chitosan (CS, Mw=50,000-190, 000 Da, degree of acetylation=75-85%) and molecular biology grade agarose (AG) produced from marine algae were purchased from Sigma Aldrich. Sodium citrate, acetic acid, and glycerol were also purchased from Sigma Aldrich. Deionized water from a Millipore vacuum filtration system was used for all experiments. All reagents were used as received.

Preparation of CS Hydrogel Fractal-Like Particles (CS FLPs)

CS solution (3 wt %) was prepared by dissolving the CS in 1.5 v/v % acetic acid solution and stirring under ambient conditions for at least 3 hours until a homogeneous solution was achieved. Sodium citrate crosslinking solution (25 mM) was prepared by dissolving and stirring in deionized water. To prepare the FLPs, CS solution was directly injected in the shear zone of the IKA Magic Lab device (IKA Works Inc.) operating at 20,000 r.p.m filled with the non-solvent sodium citrate solution. The resulting suspension of particles was centrifuged for 4 minutes with subsequent removal of the supernatant to wash off any residues of acetic acid and unreacted sodium citrate. This process was repeated 5 times and then the particles were resuspended in water.

Preparation of Bio-Composite Films

Films were prepared by the solution casting/solvent evaporation technique as shown in FIG. 1. Agarose (AG) was first dissolved in boiling water (1 wt %) for 10 minutes with the addition of glycerol plasticizer (20 w/w % w.r.t. AG) to prevent cracks in the dried films. After dissolving, the flask containing the AG and glycerol solution was cooled down rapidly under tap water while stirring. The solution was then mixed with a specified amount of the CS FLPs suspension that was pre-sonicated for 12 minutes. The sonication step ensures the FLPs suspension will be homogeneously dispersed without agglomerations that would cause defects in the films. The film-forming solutions were cast into leveled polystyrene petri dishes. After complete gelation of the solutions, the dishes were transferred to an environmental chamber where they were left to dry for 48 hours at 25±2° C. and 50±5% relative humidity. Three film compositions (5, 10, 15 w/w % w.r.t. AG) were used to gradually assess the effect of increasing the CS FLPs concentration on the films' physicochemical properties. In this text, these films are designated AG-CS FLPs 5, 10, and 15 respectively to reflect the % composition of the fractal like particles used. Control AG films were prepared with the same process without the addition of CS FLPs.

Characterization of the Bio-Composite Films

Chemical characterization (FTIR)—The infrared spectrums of the dried CS FLPs and the dried films were obtained with attenuated total reflectance Fourier Transform infrared Nicolet 6700 spectrometer in transmission mode. For each sample, 128 scans were acquired after a background correction at a resolution of 4 cm$^{-1}$. The analysis was done using Omnic Spectra software.

Mechanical properties—The mechanical properties of the films were determined according to ASTM D882-18[8]. The uniaxial tension tests were performed on rectangular test specimens (2.5 cm×10 cm) using a universal testing machine (Instron 4593) attached to a 1 kN load cell operating at a crosshead speed of 1 mm/min and a grip separation of 5 cm. The sample thickness was measured with a handheld micrometer (Marathon Management Co.) with an accuracy of 0.001 mm. Thickness was measured at five random positions for each sample and their mean value was taken as the film's thickness. Average results were calculated from five replicates for each sample.

Optical properties—The light transmittance of the AG-CS FLPs composite films was measured using UV-Vis spectrometer (Jasco UV/Vis V-550 spectrophotometer) in the wavelength range between 250 and 800 nm.

Water contact angle—Static contact angle measurements were performed on a Goniometer (First Ten Angstroms 1000B) using the sessile drop method. A gastight 500 μL syringe (Hamilton®) was used to place a water droplet (5 μL) on the surface of the film and the contact angle was recorded after 10 seconds[9]. Three different places were tested for each film with the average recorded for the sample and the average of three replicates for each sample was calculated.

Swelling properties—The swelling capacity of the AG-CS FLPs composite films was determined gravimetrically by measuring the sample's weight variation after soaking in DI water for a specified amount of time. At each point in time, films (2 cm×2 cm) submerged in a 50 ml water bath were taken out and blot dried gently using filter paper to remove excess surface water and then weighed immediately. The degree of swelling was calculated as follows:

$$DS\ (\%) = \frac{M_i - M_o}{M_o} * 100$$

where $M_i$ is the mass of the swollen film at a given point in time and $M_o$ is the initial mass of the dried film before immersion.

Oxygen permeability characterization—The oxygen permeability was measured using a permeability analyzer (OX-TRAN 1/50, Mocon) equipped with a film permeation chamber. Circular samples (area=5 cm$^2$) were mounted in the chamber, then the permeating oxygen was measured at specific time intervals at 23° C. and 50% relative humidity. The oxygen permeability (OP) is given in the units of [cm$^3$ μm (m$^2$ day kPa)$^1$]. The reported result is the average of 3 samples.

Results and Discussion

Figure 2A:
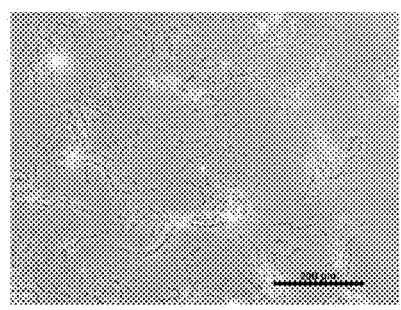
FIG. 2A is an optical microscopy image of the CS FLP dispersion in water in accordance with embodiments of the present disclosure.
Figure 2B:
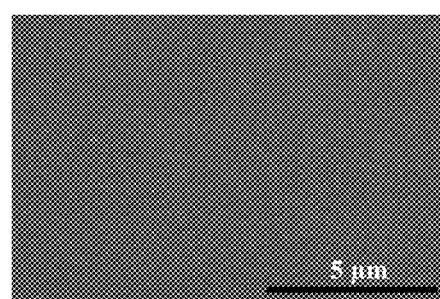
FIGS. 2B-2E are example SEM micrographs showing the surface morphology of the control AG film, AG-CS FLPs 5, AG-CS FLPs 10, AG-CS FLPs 15 films, respectively.
Figure 2C:
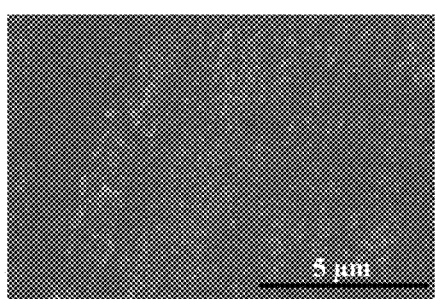
Figure 2D:
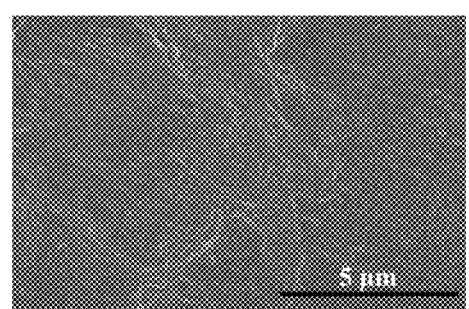
Figure 2E:
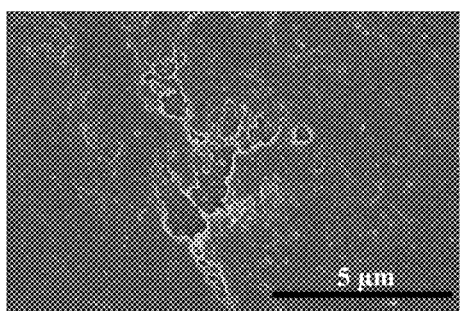

Morphological analysis—FIG. 2A shows an optical microscopy image of the CS FLPs dispersion in water. The particles are highly branched with a surrounding corona of nanoscale fibers. The SEM surface micrographs of the control and the composite films are shown in FIGS. 2B-2E. The surface of the pure agarose film is smooth without any characteristic features (FIG. 2B), while that of the composite films shows increased roughness as the concentration of the CS FLPs increases in the films. Despite the increased roughness, signs of particles agglomeration are not obvious in the surface images which suggests well dispersion of the particles within the AG matrix.

Figure 3:
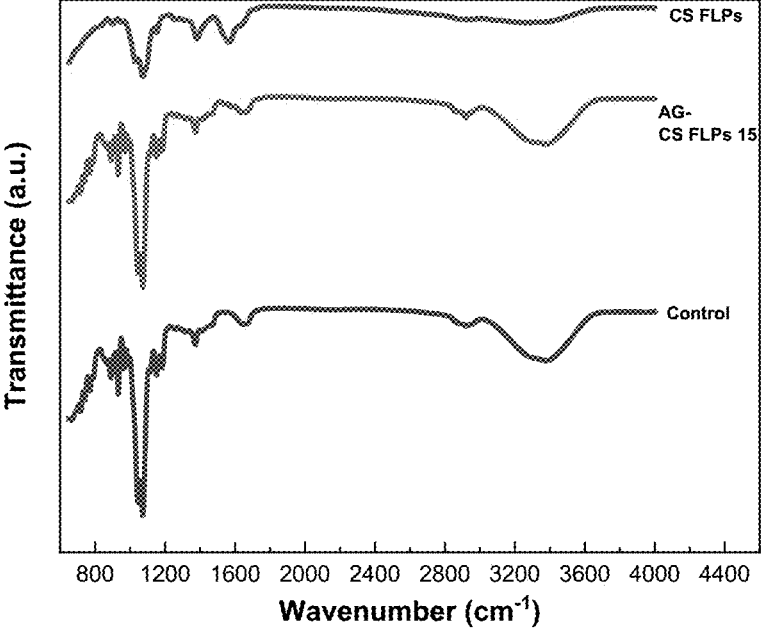
FIG. 3 is an ATR-FTIR spectra of the pure AG film, CS FLPs, and their composite AG-CS FLPs 15 film.

Chemical characterization—The functional groups of the plasticized AG film, crosslinked CS FLPs, and the highest concentration composite film, AG-CS FLPs 15, film have been identified using FTIR-ATR as shown in FIG. 3. In this analysis, we will focus on the functional group region which extends from wavenumbers of 4000 cm$^{-1}$ to 1450 cm$^{-1}$. From the control AG film plasticized with glycerol spectrum, the characteristic peak at 3385 cm$^{-1}$ corresponds to the OH-stretching vibration. A similar broader band is observed for crosslinked CS FLPs around 3261 cm$^{-1}$ and is attributed to the free hydroxyl vibration. In the case AG-CS FLPs 15 film, the OH stretching peak shifted to a higher wavenumber at 3390 cm$^{-1}$ which can indicate the formation of hydrogen bonding between the hydroxyl groups in the AG and the amide groups of the CS FLPs.[6]

Figure 4A:
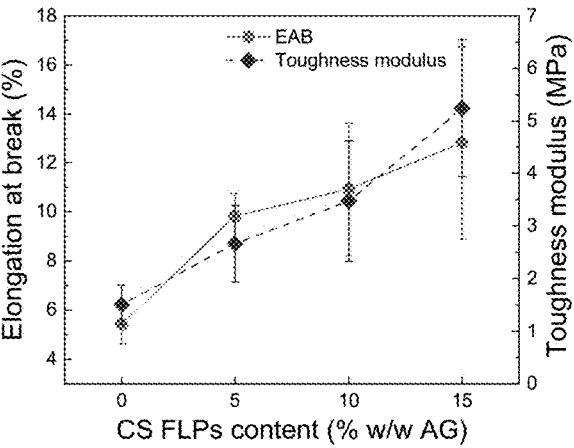
FIG. 4A shows data on the elongation at break and toughness modulus of the AG control film and the composites.
Figure 4B:
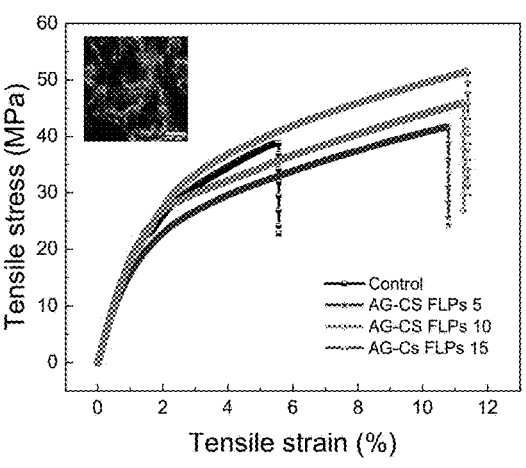
FIG. 4B provides stress-strain curves for the AG and composite films.
Figure 4B:
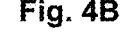
Figure 4C:
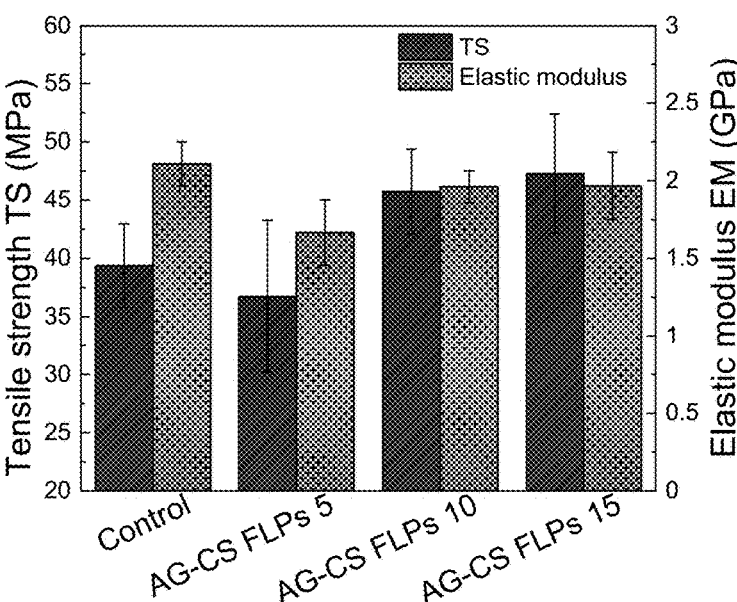
FIG. 4C shows tensile strength and elastic modulus data of the films in accordance with embodiments of the present disclosure.
Figures 5A, 5B, 5C, 5D:
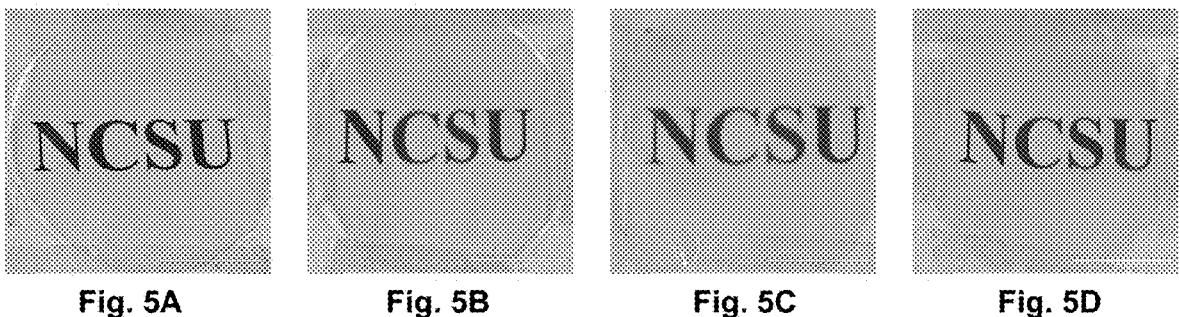
FIGS. 5A-5D are camera images of an example films in accordance with embodiments of the present disclosure. Shown are a control AG film, AG-CS FLPs 5 film, AG-CS FLPs 10 film, and AG-CS FLPs 15 composite film, respectively.
Figure 5E:
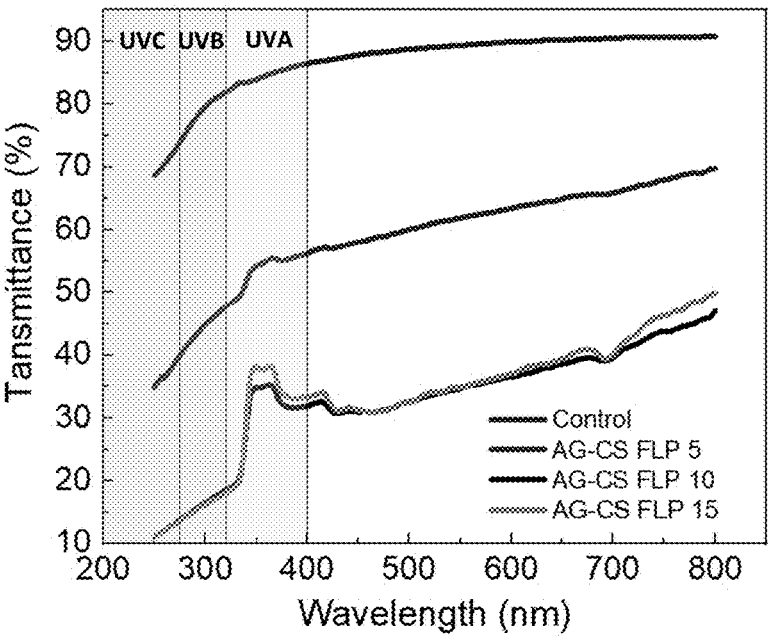
FIG. 5E shows light transmission of the control and composite films.

Mechanical properties—The mechanical properties of the control AG and the AG-CS FLPs composite films are shown in FIGS. 4A-4C. From the stress-strain curves (FIG. 4B), it is obvious that the addition of CS FLPs to the AG matrix leads to a significant improvement in both the strength and elongation at break of the films. Tensile data were extracted from the stress-strain curves and are shown in FIGS. 4A and 4C. A CS FLPs content of 5% w/w AG leads the strain at break to increase from 5% for the control AG film to 10%. Upon further increase in the CS FLPs content, the elongation continues to increase with a lower rate to reach 13% for the AG-CS FLPs 15 film. One of the most important mechanical aspects of a packaging film is its toughness modulus or the area under the stress-strain curve designating the ability of the material to absorb energy before it fractures. As seen in FIG. 4A, the toughness modulus of the composite film is considerably higher than the control AG film. With the addition of 5% CS FLPs, the toughness modulus increases by 77% compared to the control film. Upon increasing the CS FLPs concentration in the composite films, the toughness modulus continues to increase until it reaches a four-fold increase for AG-CS FLPs 15 film. In FIG. 4C, the tensile strength and Young's modulus are shown for the control and composite films. The tensile strength increases upon the addition of CS FLPs in the films, while the elastic modulus slightly decreases for the AG-CS FLPs 5 film and then rises again for the higher concentration films until it almost reaches the same value of that of the control film. These results imply that the CS FLPs addition made the films stronger but at the same time, it did not cause any added stiffness or brittleness in the composite films.

Optical properties—The light transmission of the various films is shown in FIGS. 5A-5E along with digital images of the various films showing their degree of transparency. As shown in FIGS. 5A-5D, the films remain optically clear and the text underneath them is visible even at the highest concentration of CS FLPs. Although the films remain optically transparent upon the addition of the microparticles, a haze appears in the otherwise crystal-clear AG control film. This is shown in the light transmission spectra for the same samples in FIG. 5E, where the transmittance decreases due to the addition of CS FLPs in the films. In the visible light region (650 nm), the light transmittance decreases to 65%, compared to 90% for the control film, when 5% of CS FLPs is added to the films and then drops again to a constant value of 40% transmission for the two higher concentrations films.

Figure 6:
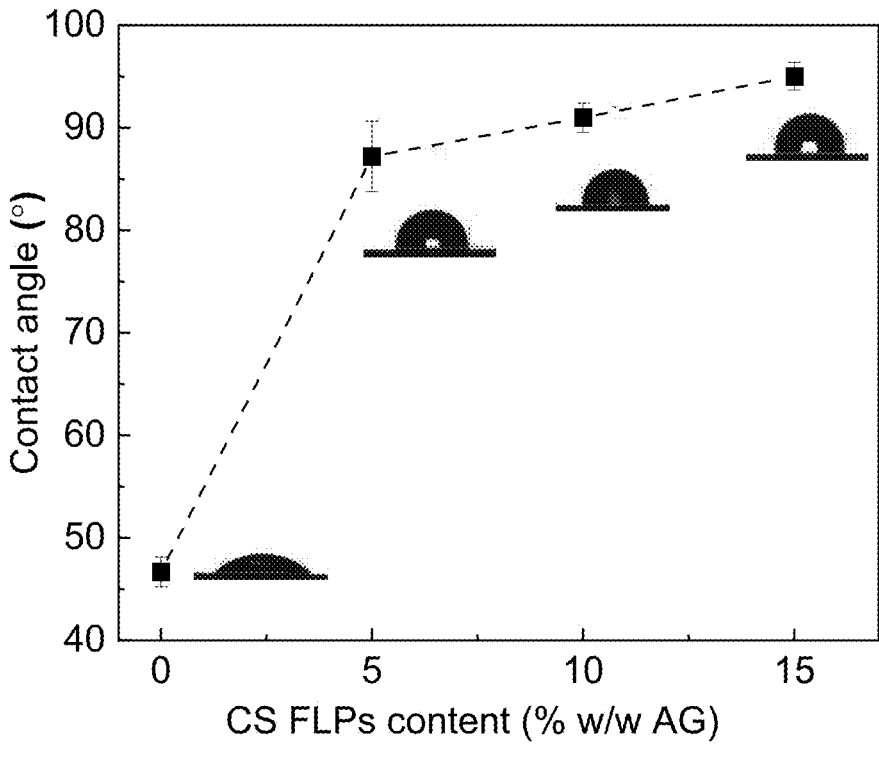
FIG. 6 demonstrates water contact angle values for the different CS FLPs loadings in the films in accordance with embodiments of the present disclosure.

Surface wettability analysis—The contact angles of water on the surface of films loaded with different percentages of CS FLPs are shown in FIG. 6. As the loading of CS FLPs increases in the films, the water contact angle gradually increases. This signifies that the films' surfaces become more hydrophobic as we increase the concentration of the microparticles added. This can be attributed to these reasons: (1) as the chitosan microparticles have a distinct morphology of being highly branched with a corona of nanofibers surrounding them, the addition of these microparticles can lead to increased surface roughness, which in turn would cause the surfaces of the films to become more hydrophobic and (2) potential interactions between the chitosan microparticles and the agarose matrix can consume the available polar groups on the films' surfaces that are able to react with water.

Figure 7:
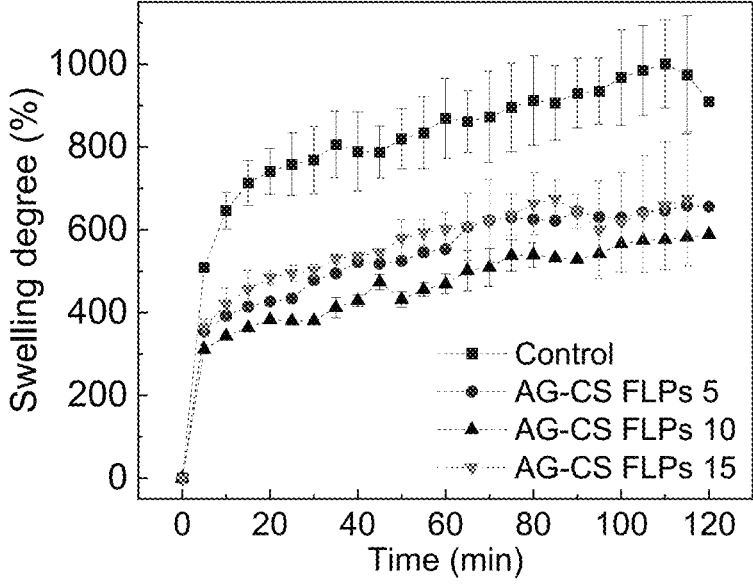
FIG. 7 demonstrates the degree of swelling of the various films with time in accordance with embodiments of the present disclosure.

Swelling properties—The swelling capacity of the different samples with time is shown in FIG. 7. The rate of water absorption greatly reduced as the concentration of the CS FLPs increased from 5% to 10% in the films. This means that as the solid content increased in the films, the hydrophilicity was reduced. Potential electrostatic interactions between the positively charged chitosan microparticles and the negatively charged remnant sulfate groups on the AG backbone can lead to a decrease in the polarity and hence, the reduction in the water absorption.

The oxygen permeability of the AG-CS FLPs 15 film was 6.07 [$cm^3$ $\mu m$ ($m^2$ day $kPa$)$^{-1}$]. This oxygen permeability is 4× lower than that of the control AG film. This decreased permeability is attributed to the tight packing and intertwining of the CS FLPs fibers inside the films which increase the tortuosity on the path of the oxygen molecules.

Comparison with Commercial Packaging

Figure 8:
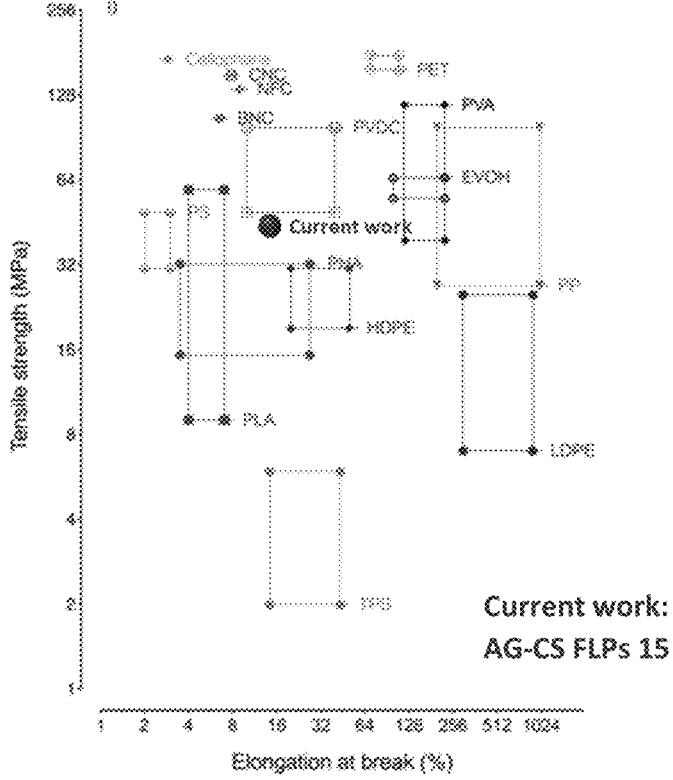
FIG. 8 provides a comparison between the properties of AG-CS FLPs 15 film of the present disclosure and common petroleum-based packaging materials available on the market.

As shown in FIG. 8 below, the mechanical properties of the highest concentration composite film (AG-CS FLPs 15) are comparable and even outperform some of the most common petroleum-based and plant derived polymers. Tensile strength and Young's modulus are 25% and 81% higher than cellulose acetate films, respectively. Cellulose acetate is one of the potential natural substitutes for fossil fuels-based polymers, though its mechanical properties are still a point of concern for large applications. Reinforcing cellulose acetate has been suggested and performed in literature, however, usually reinforcing its matrix requires special modifications for the filler to improve its compatibility.[10]

Provided herein are methods for highly scalable and effortless preparation of the chitosan microparticles and the facile subsequent step of blending it within the polymer matrix without the need for any modifications. The improved mechanical, swelling, and hydrophobic properties, make this technique convenient for industrial applications. Moreover, the versatile preparation technique of the microparticles can be applied to any biopolymer or synthetic polymer as long as it is dissolvable, which means various polymers can be used with the same technique to advantageously adjust the resultant properties.

REFERENCES (1) Roh, S.; Williams, A. H.; Bang, R. S.; Stoyanov, S. D.; Velev, O. D. Soft Dendritic Microparticles with Unusual Adhesion and Structuring Properties. *Nat. Mater.* 2019. https://doi.org/10.1038/s41563-019-0508-z.

(2) Geyer, R.; Jambeck, J. R.; Law, K. L. Production, Use, and Fate of All Plastics Ever Made. *Sci. Adv.* 2017. https://doi.org/10.1126/sciadv.1700782.

(3) Talashuk, V. Closing the loop on single-use food packaging https://www.ellenmacarthurfoundation.org/case-studies/closing-the-loop-on-single-use-food-packaging (accessed Apr. 21, 2020).

(4) Papadopoulou, E. L.; Paul, U. C.; Tran, T. N.; Suarato, G.; Ceseracciu, L.; Marras, S.; D'arcy, R.; Athanassiou, A. Sustainable Active Food Packaging from Poly(Lactic Acid) and Cocoa Bean Shells. *ACS Appl. Mater. Interfaces* 2019, 11 (34), 31317-31327. https://doi.org/10.1021/acsami.9b09755.

(5) Awadhiya, A.; Kumar, D.; Verma, V. Crosslinking of Agarose Bioplastic Using Citric Acid. *Carbohydr. Polym.* 2016, 151, 60-67. https://doi.org/10.1016/j.carbpol.2016.5.040.

(6) Felfel, R. M.; Hossain, K. M. Z.; Kabir, S. F.; Liew, S. Y.; Ahmed, I.; Grant, D. M. Flexible and Transparent Films Produced from Cellulose Nanowhisker Reinforced Agarose. *Carbohydr. Polym.* 2018, 194, 328-338. https://doi.org/10.1016/j.carbpol.2018.4.005.

(7) Li, X.; Gao, H.; Scrivens, W. A.; Fei, D.; Thakur, V.; Sutton, M. A.; Reynolds, A. P.; Myrick, M. L. Structural and Mechanical Characterization of Nanoclay-Reinforced Agarose Nanocomposites. *Nanotechnology* 2005, 16 (10), 2020-2029. https://doi.org/10.1088/0957-4484/16/10/006.

(8) American Society for Testing and Materials. *Standard Test Method for Tensile Properties of Thin Plastic Sheeting, ASTM International;* 2018. https://doi.org/10.1520/D0882-18.

(9) Zhao, T.; Jiang, L. Contact Angle Measurement of Natural Materials. Colloids Surfaces B Biointerfaces 2018, 161, 324-330. https://doi.org/10.1016/j.colsurfb.2017.10.056.

(10) Wang, Z. Y. W. The Transparency and Mechanical Properties of Cellulose Acetate Nanocomposites Using Cellulose Nanowhiskers as Fillers. 2013, 159-168. https://doi.org/10.1007/si0570-12-9796-z.

(11) Bastarrachea, L.; Dhawan, S.; Sablani, S. S. Engineering Properties of Polymeric-Based Antimicrobial Films for Food Packaging. *Food Eng. Rev.* 2011, 3 (2), 79-93. https://doi.org/10.1007/s12393-11-9034-8.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, "about 0" can refer to 0, 0.001, 0.01, or 0.1. In an embodiment, the term "about" can include traditional rounding according to significant figures of the numerical value. In addition, the phrase "about 'x' to 'y'" includes "about 'x' to about 'y'".

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

What is claimed is:

1. A biopolymer composite film comprising a polysaccharide and soft dendritic colloids, wherein the soft dendritic colloids are about 5% w/w to 20% of the polysaccharide, and wherein the soft dendritic colloids are synthesized from chitosan to form nanofibrillated chitosan.

2. The biopolymer composite film according to claim 1, wherein the polysaccharide is agarose.

3. The biopolymer composite film according to claim 1, further comprising a plasticizer.

4. A biopolymer composite film comprising a polysaccharide and soft dendritic colloids;

wherein the soft dendritic colloids are synthesized from chitosan to form nanofibrillated chitosan;

wherein the polysaccharide is agarose;

wherein the nanofibrillated chitosan is about 15% w/w of the agarose; and wherein the biopolymer composite film has a tensile strength of about 50 MPa.

5. A consumer product packaging film comprising:

a biopolymer composite film comprising a polysaccharide and soft dendritic colloids, wherein the soft dendritic colloids are about 5% w/w to 20% of the polysaccharide, and wherein the soft dendritic colloids are synthesized from chitosan to form nanofibrillated chitosan.

6. The consumer product packaging film of claim 5, wherein the polysaccharide is agarose.

7. The consumer product packaging film according to claim 5, wherein the consumer product packaging film is optically transparent.

8. The consumer product packaging film according to claim 5, wherein the consumer product packaging film has a water contact angle of about 85° to 95°, and wherein the polysaccharide is agarose.

9. The consumer product packaging film according to claim 5, wherein the consumer product packaging film is a food packaging film.

10. The consumer product packaging film according to claim 5, wherein the consumer product packaging film is selected from a cosmetics packaging film and a household products packaging film.

11. The consumer product packaging film according to claim 5, wherein the consumer product packaging film is environmentally benign.

12. The consumer product packaging film according to claim 6, wherein the nanofibrillated chitosan is about 15% w/w of the agarose, and wherein the film has a tensile strength of about 50 MPa.

* * * * *